203-146 S-
12/30/86 YR RE 32,321

United States Patent [19]

Tobin

[11] E Patent Number: Re. 32,321

[45] Reissued Date of Patent: Dec. 30, 1986

[54] ELECTRIC SWITCH AND IMPROVED DEVICE USING SAME

[75] Inventor: Thomas J. Tobin, Northbrook, Ill.

[73] Assignee: S&C Electric Company, Chicago, Ill.

[21] Appl. No.: 574,361

[22] Filed: Jan. 27, 1984

Related U.S. Patent Documents

Reissue of:

[64] Patent No.: 4,370,531
Issued: Jan. 25, 1983
Appl. No.: 188,660
Filed: Sep. 19, 1980

[51] Int. Cl.[4] ..... H01H 33/06

[52] U.S. Cl. ..... 200/82 B; 200/146 R;148 R;151

[58] Field of Search ..... 200/82 B, 148 R, 15., 200/146 R

[56] References Cited

U.S. PATENT DOCUMENTS

| | | | |
|---|---|---|---|
| 2,104,914 | 1/1938 | Temple, Jr. | 200/82 B |
| 2,247,815 | 7/1941 | Lohausen | 200/117 |
| 2,861,153 | 11/1958 | Erk et al. | 200/61.08 |
| 3,076,076 | 1/1963 | Bridges | 200/114 |
| 3,129,307 | 4/1964 | DeVargas | 200/151 |
| 3,144,536 | 8/1964 | Bridges et al. | 200/146 |
| 3,308,259 | 3/1967 | Hulteen et al. | 200/146 |
| 3,356,808 | 12/1967 | Dakin | 200/140 |
| 4,013,852 | 3/1977 | Roberts et al. | 200/146 |
| 4,342,978 | 8/1982 | Meister | 337/6 |
| 4,494,103 | 1/1985 | Jarosz et al. | 200/82 B |

FOREIGN PATENT DOCUMENTS

| | | | |
|---|---|---|---|
| 662342 | 7/1938 | Fed. Rep. of Germany . | |
| 697236 | 10/1930 | France | 200/151 |

OTHER PUBLICATIONS

Product catalog published by A. B. Chance Co., Centralia, Mo., Section 1005, p. 3, "The Saf-T-Gap Interrupter", dated Jul. 1976.

*Primary Examiner*—Robert S. Macon
*Attorney, Agent, or Firm*—Kirkland & Ellis

[57] ABSTRACT

A high speed switch usable at high voltage includes a pair of contacts movable apart along a fixed line. When the contacts are normally interconnected, at least one of them contributes to the definition of an enclosed chamber. Pressurization of the chamber by the ignition of a power cartridge therein rapidly drives the contacts apart, forming a first gap between them. When the contacts are interconnected, a first one of them is electrically connected to a terminal. As the contacts move apart, a second gap forms between the first contact and the terminal. The second gap is electrically insulated and may both be shielded from the ignition products of the cartridge and have any arc forming therein constricted and subjected to arc-extinguishing gas. The contacts may be shunted by a fuse to which current is commutated after the contacts move apart.

30 Claims, 5 Drawing Figures

ELECTRIC SWITCH AND IMPROVED DEVICE USING SAME

Matter enclosed in heavy brackets [ ] appears in the original patent but forms no part of this reissue specification; matter printed in italics indicates the additions made by reissue.

*This is an application for reissue of U.S. Pat. No. 4,370,531 issued Jan. 25, 1983, on application Ser. No. 188,660, filed Sept. 19, 1980.*

BACKGROUND OF THE INVENTION

1. Field of the Invention

The present invention relates to an improved electric switch and to an improved device containing the improved switch. More specifically, the present invention constitutes an improvement of the invention claimed in commonly-assigned U.S. patent application, Ser. No. 972,650, filed Dec. 21, 1978 in the name of Otto Meister.

The '650 application relates to a circuit-protection device which includes a first current path having a high continuous current-rating. A pair of normally electrically interconnected contacts are included in the first path. The contacts are relatively movable apart along a fixed line of direction. When the contacts move apart, the electrical interconnection therebetween is broken to open the first path. When the contacts are electrically interconnected, at least one of them defines an enclosed chamber. An ignitable device, such as a power cartridge, is included in the chamber for pressurizing it upon ignition thereof to rapidly drive the contacts apart. A second current path is in electrical shunt with the contacts. The second path physically surrounds, and has a lower continuous current-carrying rating than, the first path. Preferably, the second path includes a fusible element which may be either current limiting or non-current limiting. The first path normally shunts away from the fusible element the majority of the current through the device. When the contacts move apart, current is commutated to the fuse for interruption thereof. Preferably, the power cartridge is ignited to move the contacts apart in response to the occurrence of a fault current or other over-current in a circuit in which the device is connected. As more fully explained in the '650 application, in this way current-limiting fuses which may have high fault current interrupting ratings but low continuous current-carrying ratings may be used to protect circuits having high continuous currents, because the first path, including the contacts, normally carries the majority of the current in the circuit.

Brief Discussion of the Prior Art

A fault current (used herein to mean any undesirable over-current) can impress rather stringent thermal and mechanical stresses on high-voltage electrical systems and on apparatus used in such systems. The severity of the thermal stress is known to be generally proportional to the product of (1) the square of the fault current, and (2) time—that is, $I^2t$. The severity of the mechanical stress is generally proportional to the square of the peak or crest value achieved by the fault current. Thermal stress is generally manifested in the burning down of, or other thermal damage to, lines, cables and equipment. Mechanical stress is manifested in the deformation of bus work and switches and in damage to items, such as transformers or reactor coils, due to the extremely high magnetic forces generated by a fault current.

Current-limiting fuses of the so-called silver-sand variety and other current-limiting devices are well known expedients for limiting the magnitude of a fault current. See the following commonly-assigned U.S. Pat. Nos.: 4,063,203 to Bernatt; 4,057,775 to Biller; 4,035,753 to Reeder; 4,028,656 to Schmunk and Tobin; 4,011,537 to Jackson and Tobin; and 4,010,438 to Scherer. Current-limiting fuses interrupt fault current by limiting the peak of the fault current and $I^2t$ to tolerable levels, thereby minimizing thermal and mechanical stress. These tolerable levels of peak fault current and $I^2t$ are often termed the "let through current" or simply "let through". As is well known, current-limiting fuses, particularly at higher voltages, have relatively low continuous current ratings which impose limitations on the applicability thereof.

As electrical systems have expanded and electrical consumption has increased, continuous current in such systems has also increased. Because of the low continuous current rating of conventional silver-sand current-limiting fuses, such fuses have limited applicability in the systems. The low continuous current rating of current-limiting fuses is apparently inherent. Most known current-limiting fuses cannot meet both the requirements of low "let through" and high continuous current rating without some modification or the addition of some special apparatus. Further, fault current levels have begun to exceed the capabilities of existing switchgear. If, in order to avoid the occurrence of increased fault currents, electrical systems are arranged so that they contain individual sections having low available fault currents, or if current limiting reactors, high impedance transformers, or the like are used, certain disadvantages may nevertheless result. For example, sectionalizing and the use of current-limiting reactors are uneconomical and may render voltage regulation difficult to achieve. These techniques also usually produce an over-abundance of idle reserve in the electrical system. Thus, unless an economical and reliable current-limiting fuse having a high continuous current rating becomes generally available, the only solution—a costly one—to solve the problem of increased fault current levels is to replace existing switchgear with gear having higher fault current withstand capabilities and higher interrupting capabilities. Accordingly, the fault-limiting properties of current-limiting fuses have been and remain the subject of great interest.

Approximately twenty years ago, a device, sometimes referred to as an "$I_s$ Limiter," was developed by Calor-Emag Corporation (now a division of Brown Boveri, West Germany). The $I_s$ Limiter is constructed with a high continuous-current-capacity, main conductive path which is electrically paralleled with a more or less standard current-limiting fuse. The current-limiting fuse may be of the well known silver-sand type having a silver fusible element surrounded by a fulgurite-forming, arc-quenching medium, such as silica or quartz sand. The main conductive path of the $I_s$ Limiter includes a so-called "bursting bridge" which upon detonation of a chemical charge contained therewithin in response to a fault current renders the main conductive path discontinuous and rapidly transfers or commutates the current in the main conductive path to the current-limiting fuse.

The bursting bridge is comprised of a pair of tubular sections, each open at one end and containing longitudinal slots over the majority of the length. The open ends of the tube sections are joined along a brazed, weak interface to enclose the chemical charge. Detonation of the chemical charge breaks the weak interface, blowing up the bursting bridge, and bending fingers defined between the slots of each section out and back in a "banana peel" configuration; this renders discontinuous the main conductive path. See U.S. Pat. No. 2,892,062 to Bruckner, et al. This discontinuity in the main conductive path transfers or commutates the current to the current-limiting fuse, which current is then interrupted in a conventional manner common to silver-sand current-limiting fuses. The chemical charge is detonated by means of a pulse transformer or other device contained in one of two insulators which mounts the combination of the current limiting fuse and the main conductive path, each of which is housed in its own individual insulative housing. When the bursting bridge is blown apart, an arc typically forms between the tube sections. The arc voltage is sometime thereafter sufficiently elevated to commutate the current to the fuse so that interruption therein may occur.

If not properly fabricated, the bursting bridge may not fully open. Further, it has been found that the gap between the bent back fingers of the tube sections may be contaminated or ionized by the chemical charge or the arc. Specifically, when the chemical charge detonates, hot ignition products—gaseous and solid—fill the gap. These ignition products lower the dielectric strength of the gap. So too, the action of the arc—the formation of which itself involves ionization of gas in the gap—on metallic or non-metallic materials in its vicinity produces ionization of the gap, further lowering the dielectric strength thereof. Such ionization, due to either or both causes, may permit the arc to persist or may lower its voltage, thus slowing or preventing commutation of the current to the current-limiting fuse. It has also been found, however, that the dielectric strength across the gap may recover or at least increase rather quickly after about 200 microseconds. Therefore, the current-limiting fuse of the $I_s$ Limiter must be so designed and constructed as to (a) overlap the "dead time" of the bursting bridge until the 200 microsecond time passes and then (b) limit and interrupt the current. Following the initial 200 microseconds, voltage stress across the gap has been found to be rather low due to the lower resistance of the fuse as compared to that of the gap. Thus, the $I_s$ Limiter is a current-limiting device combining a fast acting switch having a high continuous current capability, but poor current interrupting capability with an electrically parallel current-limiting fuse having a low continuous current capability but high current-limiting and interrupting ability.

Several disadvantages of the $I_s$ Limiter should be noted. First, the current-limiting fuse and the main conductive path form two separate elements in their own separate housings. This arrangement is not only somewhat clumsy and difficult to manipulate during replacement or initial placement, but increases material costs due to the duplication of certain elements such as housings, end ferrules, conductors, and the like. This first disadvantage of the $I_s$ Limiter is obviated by the invention claimed in the '650 application, wherein a high continuous current capability, fast acting switch, and an electrically parallel current-limiting fuse are contained in the same housing. A second disadvantage of the $I_s$ Limiter relates to the fact that commutation of the current flowing in the main current path to the current-limiting fuse may be slower than it might otherwise be because of the inductance of the main conductive path and current-limiting fuse combination. This second disadvantage of the $I_s$ Limiter is also obviated by the invention claimed in the '650 application by surrounding the main current path with the current limiting fuse to minimize the inductance of the combination.

A third disadvantage of the $I_s$ Limiter is that there is a practical limitation to the size of the gap that can be formed by the bursting bridge. Specifically, only so much chemical charge may be confined within a practical volume of the bursting bridge to ensure that the fingers defined by the slots in the two tube sections are sufficiently blown outwardly and bent backwardly. That is, the tube sections could be greatly elongated and filled with a chemical charge of larger size so that detonation bends back fingers of increased length. Both the increased size of the charge and the length of the fingers, however, require a larger housing of higher burst strength, adding to the cost and inconvenience of the overall device. This third disadvantage of the $I_s$ Limiter is obviated by the invention claimed in the '650 application. Specifically, rather than including a bursting bridge, the high-speed switch of the invention of the '650 application comprises a pair of normally electrically connected contacts which are rapidly driven apart along a fixed line by the ignition of a power cartridge. In this way, the switch of the '650 application does not depend upon the fracturing (blowing apart) and peeling back of portions of the main current path as is the case with the $I_s$ Limiter; rather, the contacts are positively driven and moved apart, ensuring that a large gap is opened therebetween. See also the devices shown in German Offenlegungsschrift No. [1,904,224] *1,904,244*, published Aug. 6, 1970, and an article entitled, "Ultra-High Speed Protection Device-Fuji Ultrup Fuse" in the Fuji Electric Review, Vol. 18, No. 1 (1972) Pages 49–51.

A fourth disadvantage of the $I_s$ Limiter, alluded to above, relates to the fact that some coordination between the operation of the current-limiting fuse and the dielectric recovery of the gap formed between the tubular sections of the bursting bridge is necessary. Due to the vagaries of fault current conditions in high-voltage circuits, this coordination may prove difficult to achieve. The switches of the '650 patent application and of the German Offenlegungesschrift and the Fuji article suffer from a similar disadvantage. Simply stated, the need to await the dielectric recovery of the gap is due, in part, to contamination of the gap by both the arc that forms therein and by the ignition products of the chemical charge used to open the first current path. Even ignoring gap contamination, there is evidence that where only a single gap is opened, as occurs in the prior art devices so far discussed, a sufficiently high arc voltage may not always predictably exist at an early enough time to transfer current to the fuse and ensure appropriate fault-current limitation and interruption. That is, even where current commutation to the fuse does occur, the operation of the fuse may itself entail an arc voltage sufficiently elevated to retransfer current to the main path if the single gap therein is contaminated for any reason.

The above-described need for coordination insofar as it is due to dielectric recovery problems or gap contamination has been at least partly solved by the invention claimed in commonly-assigned U.S. patent application Ser. No. 21,646, filed Mar. 19, 1979 in the name of Otto Meister. In that invention, which constitutes an improvement of the invention of the '650 patent application, one of the contacts mounts a piston. The piston defines an enclosed chamber in combination with the other contact. The piston is preferably insulative and may be made of an ablative, arc-extinguishing material. The piston is also configured so that when the power cartridge is ignited to pressurize the chamber and drive the contacts apart, the piston is forced into intimate contact with the walls of a sleeve-like liner, also preferably made of an ablative, arc-extinguishing material. In this way, the contact which mounts the piston is isolated from the ignition products of the power cartridge and other contaminants in the gap. Also, the engagement between the piston and the liner constricts and subjects to the action of de-ionizing arc-extinguishing gas any arc that forms between the contacts following their movement apart similar to so-called trailer-liner or rod-tube interrupters. Such constriction and arc-extinguishing gas evolution tend to elevate the arc voltage, extinguish the arc, or both, which increases the likelihood that current will be commutated to the fuse. Further, the isolation of the contact by the piston from contaminants—whether produced by the power cartridge or the arc—tends to ensure that the gap has a high dielectric strength as the fuse operation, thus inhibiting current retransfer from the fuse to the main path. Thus, the invention claimed in the '646 patent application takes long strides toward solving the coordination and dielectric recovery problems of the $I_s$ Limiter, the device of the '650 application and the device of the German Offenlegungsschrift and the Fuji Electric Review.

Nevertheless, the invention claimed in the '646 patent application, as do earlier inventions, depends for current commutation to the second path and to the current limiting fuse therein on the opening of a single gap. It is possible that such a single gap may not always reliably ensure current commutation of the type resulting in appropriate current limitation and interruption. Specifically, where a single gap is relied on, even if the piston of the '646 application is present, any arc therein both contaminates the gap and erodes the piston and the liner. This erosion may permit contaminants to be distributed across the gap. These contaminants may present sufficient elevation of the arc voltage to commutate current to the fuse or, if the current is commutated, may allow retransfer of current to the main path as the fuse operates. Thus, the present invention constitutes, in general, an improvement of the invention claimed in the '650 application, an alternative to the invention claimed in the '646 application and, more specifically, a solution to the coordination and dielectric recovery problems residing in prior art devices.

Additional background and discussion of other prior art is more fully set forth in the '650 and '646 patent applications, which are specifically incorporated by reference hereinto.

SUMMARY OF THE INVENTION

With the above and other objects in view, the present invention relates to an improved electrical switch for opening a first current path in which the switch is included. The switch includes a pair of normally electrically interconnected contacts which carry current in the first current path. The contacts are relatively movable apart along a fixed line of direction to break the electrical interconnection therebetween. The breaking of this electrical interconnection opens the first current path. At least one of the interconnected contacts defines, or aids in defining, an enclosed chamber. The chamber includes an ignitable facility, such as a power cartridge. When the ignitable facility ignites, the chamber is pressurized to rapidly drive the contacts apart.

The improved switch of the present invention also includes a terminal in the first current path. Facilities are included for electrically connecting one of the contacts to the terminal when the contacts are electrically interconnected. In this fashion, the terminal and the contacts are in series in the first current path. These facilities electrically insulate the one contact from the terminal as and when the contacts move apart. This has the effect of both isolating either the terminal, the one contact, or both from the ignition products of the power cartridge, as well as of constricting any arc which forms between the one contact and the terminal. Accordingly, in the improved switch, two gaps are open. The first gap is opened between the contacts, while the second gap is opened between the one contact and the terminal.

In preferred embodiments, a second current path, which preferably includes a current-limiting fuse, is in shunt with the terminal and the contacts. The first current path has a high current carrying rating and normally, when the contacts have not been moved apart, a lower resistance than the second current path, which has a low current carrying capacity and a higher resistance. The opening of the two gaps in the first current path ensures that the arc voltage thereof is sufficiently high to ensure rapid transfer of current in the first current path to the second current path and to the fuse therein. Furthermore, the dielectric withstand of the first current path is increased by isolating the gap between the terminal and the one contact from the ignition products of the power cartridge to ensure that after the switch opens, the first current path does not again conduct current.

BRIEF DESCRIPTION OF THE [DRAWING] *DRAWINGS*

DETAILED DESCRIPTION

Figure 1:
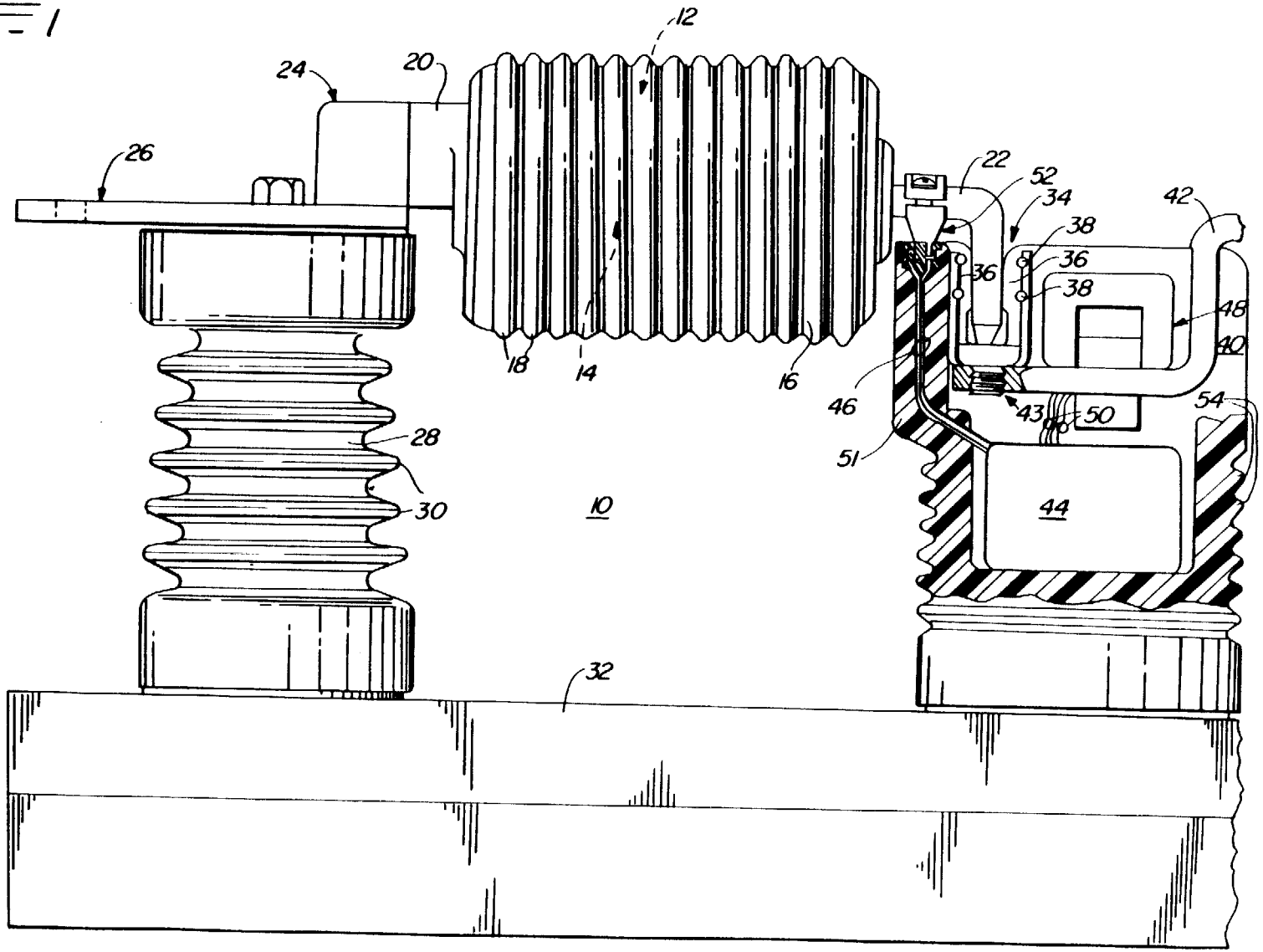
FIG. 1 depicts an exterior side elevation of a high-voltage device [or fuse] in accordance with the principles of the present invention; the device is mounted between a pair of insulators, one of which is partially sectioned to generally depict a sensing and triggering unit contained therein.

Referring first to FIG. 1, there is shown a general exterior view of a novel high-voltage device 10 in accordance with the principles of the present invention. The novel device 10 may include a fuse, generally indicated at 12, and a novel switch, generally indicated at 14, both contained within an outer, elongated, insulative housing 16. The fuse 12 may be either current limiting or non-current limiting, although the former is preferred. The outer housing 16 may contain a plurality of leakage-distance-increasing skirts 18, as is well known, and may be made of porcelain or other insulative material, such as molded cycloaliphatic epoxy resin. The outer housing 16 may surround an inner housing 19 (FIG. 5) preferably made of glass fiber-reinforced epoxy. The switch 14 may be contained by the inner housing 19, while the fuse 12 may be located between the housings 16 and 19, as described more fully below.

Extending from one end of the housing 16 is a first terminal 20 which is electrically connected to various elements within the housings 16 and 19 in a manner to be described below. Extending from the other end of the housing 16 is a second terminal 22 which is also electrically connected to elements within the housings 16 and 19. The terminal 20 may be detachably connectable in any convenient fashion to a mounting facility 24 which may be formed integrally with or otherwise suitably connected to a cable or line attachment facility 26. One cable or line (not shown) of a circuit (not shown) in which the device 10 is used is attachable in any convenient manner to the attachment facility 26. The mounting facility 24 and the cable-attachment facility 26 are supported by and are attached to a support insulator 28 formed of porcelain or other convenient insulative material, such as cycloaliphatic epoxy resin. The insulator 28 may contain a plurality of leakage-distance-increasing skirts 30 and is supported on a common base 32 which may be a structural steel member or the like.

The other terminal 22 may take any convenient configuration, the inverted L-shape depicted in FIG. 1 being one example thereof. The terminal 22 is detachably engageable by a mounting facility 34. If the terminal 22 takes a generally circular cross-section, the mounting facility 34 may comprise a plurality of contact fingers 36 (only two are shown), spring-biased into intimate engagement with the terminal 22 by one or more garter springs 38. The mounting facility 34 may be molded in as an integral part of an insulator 40 which may be made of porcelain, a cycloaliphatic epoxy resin, or other suitable insulative material. Also contained within the insulator 40 may be a conductor 42, which is continuously connected to the fingers 36 as at 43, and which is connectable to another cable or line (not shown) of the circuit.

A sensing and triggering unit 44 generates appropriate output signals on output conductors 46 for a purpose to be described below in response to the condition of current in the conductor 42, which may be sensed by a current transformer 48. The unit 44 and the transformer 48 may be integrally molded into the insulator 40. The current transformer 48 and the sensing and triggering unit 44 are interconnected by appropriate leads 50. The output conductors 46 of the sensing and triggering unit 44 may pass through both a portion 51 of the insulator 40 and an appropriate detachable clamp member 52 surrounding the terminal 22. The output conductors 46 may enter the interior of the housings 16 and 19 through the terminal 22 which may be hollow for this purpose. The insulator 40 may contain a plurality of leakage-distance-increasing skirts 54 and is attached to the common base 32. The present invention contemplates that the unit 44 and/or the transformer 48 may be within the housing 16 or in a separate housing (not shown) attached to or formed integrally with the housing 16. In this latter event, the structure of the terminal 22, the mounting facility 34, and the insulator 40 may well vary from that depicted in FIG. 1.

The insulators 28 and 40 on the one hand, and the device 10 on the other hand, as shown in FIG. 1, have respective vertical and horizontal orientations. Any of these components may be mounted in any other desired orientation, as should be obvious. The unit 44 and the transformer 48 may be reusable; only the fuse 12 and the switch 14 require replacement following operation of the device 10.

Figure 3:
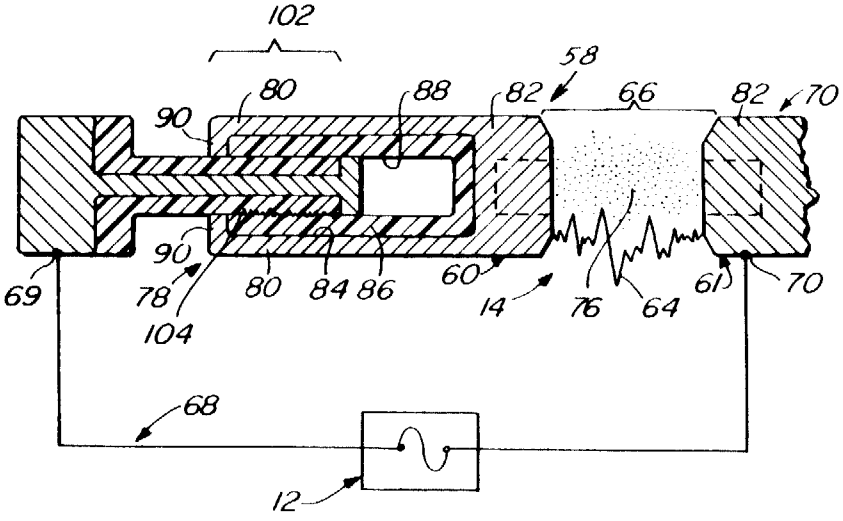
FIG. 3 is a partially sectioned, side elevational view of the switch of FIG. 2 in the open position.
Figure 2:
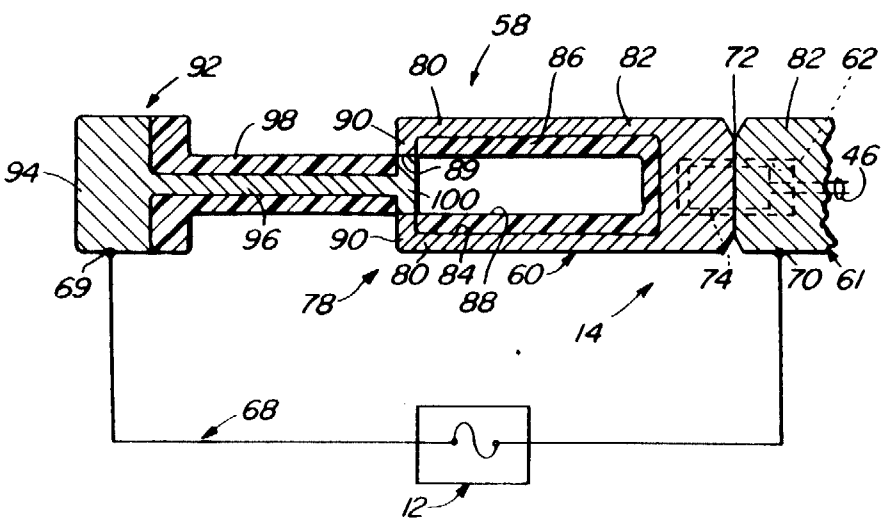
FIG. 2 is a partially sectioned, side elevational view of a generalized portion of a switch depicting certain novel features in accordance with the present invention; the switch is closed and constitutes a portion of the device shown in FIG. 1.

Referring now to FIGS. 2 and 3, there is shown a portion of a generalized version of the switch 14 in accordance with the principles of this invention. The fuse 12, usable with the switch 14 to form the device 10 of the present invention, is shown only schematically in FIGS. 2 and 3.

As more fully disclosed in the '650 patent application, the switch 14 is located in a first current path 58 and includes a pair of contacts 60 and 61 relatively movable apart along a fixed line of direction. The contacts 60 and 61 are normally positioned so as to be electrically, serially interconnected by a conductive metallic connection, as shown in FIG. 2, wherein the switch 14 is closed. The metallic connection may take numerous forms, exemplary of which are direct physical engagement (as depicted in FIG. 2), close proximity with a small space therebetween including a quantity of conductive material or separation with one or more conductive members attached therebetween [(as in FIGS. 4 and 5)] *(as in FIG. 5)*. When the contacts 60 and 61 are normally positioned so as to be electrically interconnected and the switch 14 is closed, at least one contact 60 or 61 (or a portion thereof or a member thereon) defines, or contributes to the definition of, a closed chamber 62. The chamber 62 may be pressurized to drive the contacts 60 farther apart than they are in their normal positions to open the switch 14. Parting movement of the contacts 60 and 61 breaks the normal electrical interconnection by rendering discontinuous the conductive metallic connection. Depending on the voltage and current at which the switch 14 is used, breaking of the normal electrical connection between the contacts 60 and 61 may or may not by itself interrupt such current and open the first current path 58. For example, as is well known, if the voltage is sufficiently high, simply rendering discontinuous the normal metallic connection may result in the formation of an arc 64 (FIG. 3) between the contacts 60 and 61. Until the arc 64 is extinguished, current continues to flow in the contacts 60 and 61 and the first current path 58 even though the metallic interconnection has been broken. If the arc 64 forms, it develops an arc voltage which may be viewed as an impediment to current flow in the first current path 58. Whether the arc forms or not, there is between the contacts 60 and 61 a gap 66 (FIG. 3).

In preferred embodiments, the normal series combination of the contacts 60 and 61 in the first current path 58 has a low resistance or impedance to current flow and a high current-carrying capacity. The contacts 60 and 61 may be shunted by a higher impedance second conductive path 68 electrically connected to the first path 58 as schematically indicated at 69 and 70. Little current normally flows in the second path 68 when the switch 14 is closed. When the contacts 60 and 61 moves apart to break the normal electrical interconnection therebetween, current in the first path is commutated or transferred to the second or shunt path 68 if the second path 68 has a lower impedance to current flow than the first path 58, which now includes the gap 66 with or without the arc 64 therein. If extinguishment or suppression of the arc 64 is desirable, such may be made to form in the vicinity of an arc-extinguishing medium, including ablative solids (such as boric acid) or fluids (such as $SF_6$). As is well known, such media either extinguish or suppress the arc 64 or both. The purpose of the present invention is to ensure commutation of current from the first path 58 to the second path 68 whether the arc 64 forms or not, whether the arc 64 is extinguished or not, and regardless of the arc voltage of the arc 64.

The contacts 60 and 61 may be similar, generally cylindrical bodies of copper or other highly conductive material. The contacts 60 and 61 may be normally positioned to be physically engaged along an annular interface 72 in which position the contacts 60 *and 61* are electrically interconnected and; therefore, electrically continuous. At least one of the contacts 60 or 61 or a portion thereof defines the enclosed chamber 62 when the contacts 60 and 61 are electrically interconnected.

Facilities 74 are provided to selectively pressurize the chamber 62 to drive the contacts 60 and 61 apart. In FIG. 2, these facilities 74 may be a quantity of an ignitable chemical charge which preferably takes the form of a so-called power cartridge for effecting such selective pressurization. The power cartridge 74 may assume any convenient configuration. As is well known, the power cartridge 74 may constitute a so-called pressure cartridge which is capable of generating energy for any system requiring work. Such cartridges 74 usually include a unit, hermetically sealed or otherwise, containing [power] *powder* (not shown) or the like and a fusible bridge wire (not shown), the heating or fusing of which ignites the powder. Power cartridges are typically ignitable by low currents (usually in the 5 ampere range) flowing through the bridge wire. Such power cartridges 74 are available from, inter alia, Quantic Industries, Inc. of San Carlos, Calif. and Holex, Inc. of Holester, Calif. The '650 and '646 patent applications describe such power cartridges in more detail. The output conductors 46 of the sensing and triggering unit 44 [(FIGS. 1, 2, 4 and 5)] *(FIGS. 1, 2 and 5)* are appropriately connected to the bridge wire (not shown) of the power cartridge 74 for ignition thereof at an appropriate time as hereinafter described. When the power cartridge 74 is ignited, the pressure buildup in the chamber 62 rapidly moves the contacts 60 *and 61* apart. Both contacts 60 and 61 may be moved apart or one contact 60 or 61 may be stationary while the other *contact* 61 or 60 is movable. As best shown in FIG. 3, following ignition of the power cartridge 74, the gap 66 between the now separated contacts 60 and 61 is filled with the ignition products 76 thereof. It has been found that these ignition products 76 may decrease the dielectric strength in the gap 66, and accordingly, either encourage the formation of the arc 64 or, should such arc 64 form, result in a relatively low arc voltage which does not reliably assure that current is commutated from the first current path 58 to the second current path 68. It is the presence of these ignition products 76, the ionizing effect of the arc 64, and the fact that in prior art devices only a single gap, such as that at 66, is formed, which may result in less than reliable current commutation to the second path 68. Since, as set forth below, the second current path 68 includes the fuse 12, and since the device 10 made up of the fuse 12 and the switch 14 may be used to protect an electrical circuit, failure of the device 10 to experience current commutation from the first current path 58 to the second current path 68 results in the device 10 not performing its intended function.

Accordingly, continuing to refer to FIG. 2, there is shown a generalized form of an improvement in the switch 14 according to the present invention.

As depicted in FIG. 2, at least one [60] of the contacts 60 or 61 may terminate in a movable, sliding contact structure, generally designated 78, which is remote from the chamber 62 and the gap 66. In the general depiction of FIG. 2, the sliding contact structure 78 may comprise a plurality of contact fingers 80 carried by a main body portion 82 of the contact 60. The contact fingers 80 define a bore 84 which is lined with an insulative sleeve 86, preferably made of an ablative arc-extinguishing material. The sleeve 86 defines a passage 88 which is generally a continuation of an opening 89 defined by the peripheries of contact end members 90 on the contact fingers 80. The passage 88 and the opening 89 preferably have circular cross-sections, but this is not required. Instead of the fingers 80, a metal tube may be used, in which event the end members 90 are replaced by an inwardly formed lip of the tube.

In the '650 and '646 applications, the second current path 68 is directly shunted by the contacts 60 and 61. In the present invention, the second current path 68 is connected in shunt with the first current path 58, in part via a stationary terminal, generally designated 92. Specifically, one connection 69 of the second path 68 may, as shown, be made directly to an end portion 94 of the terminal 92. The other connection 70 may be made directly to the contact 61 as shown schematically in FIG. 2 if the contact 61 is stationary; if the contact 61 is movable, the schematic connection 70 may, in reality, comprise some sort of sliding contact arrangement, including one made up of members similar to the sliding contact structure 78 and the terminal 92 associated with the contact 60. The end portion 94 may be connected to or formed integrally with one of the terminals 20 or 22 in FIG. 2, while the contact 61 is electrically associated with the other terminal 20 or 22 either by direct electrical connection, if the contact 61 is stationary, or by whatever arrangement 70 facilitates connection of the second path 68 to the contact 61. Based on FIGS. 1 and 2 as presented, the end portion 94 is connected to the terminal 20 and the contact 61 is connected to the terminal 22.

Electrically continuous with the stationary end portion 94 is a stationary elongated portion 96 surrounded by an insulative sleeve 98, which is preferably made of an ablative arc-extinguishing material. The elongated portion 96 terminates in an enlarged portion 100 which is normally electrically engaged by the contact end members 90 of the contact fingers 80. The cross-section of the elongated portion 96 with the sleeve 98 thereon is approximately the same as that of the enlarged portion 100 and the sleeve 98 are conformally receivable in, or can be telescoped into, the bore 88.

In the operation of the device 10 which includes the switch 14 in accordance with FIGS. 2 and 3, current normally flows in the first current path 58 from the terminal 20 to the terminal 22 via the terminal 92, the interface between the enlarged portion 100 and the contact end members 90, the contact 60, and the other contact 61. Should a fault current occur in the circuit protected by the device 10, the power cartridge 74 is ignited to pressurize the chamber 62 and to drive the contacts 60 and 61 apart. As shown in FIG. 3, driving the contacts 60 and 61 apart forms the gap 66 therebetween which is filled with ignition products 76 of the power cartridge 74. As previously discussed, the arc 64 may also form in the gap 66. Also as previously discussed, the single arc 64 in the single gap 66 may, for a wide variety of reasons including the presence of the ignition products 76, not reliably ensure commutation of current from the first current path 58 to the second current path 68. However, movement of the contacts 60 and 61 apart also effects relative movement between the enlarged portion 100 and the contact end members 90. Specifically, as the contact end members 90 move leftwardly with the contact 60, they and the insulative sleeve 86 also move leftwardly. Such movement breaks the engagement between the enlarged portion 100 and the end members 90, positioning the enlarged portion 100 within the passage 88 where it is closely surrounded or engaged by the insulative sleeve 86. Similarly, movement of the sleeve 98 into the passage 88 relative to the end members 90 maintains these members 90 out of contact with both the enlarged portion 100 and the elongated portion 96, the latter being surrounded by the sleeve 98. Also, within the passage 88 the sleeves 86 and 98 are in close proximity. As a consequence, a second gap 102 is opened between the enlarged portion 100 and the end members 90. The gap 102 ensures that the impedance of the first path 58 is higher than that of the second path 68 following separation of the contacts 60 and 61 than is the case when only the first gap 66 is opened. Moreover, when a second arc such as that depicted at 104 forms between the enlarged portion 100 and the end members 90, such arc 104 is constricted between the sleeves 86 and 98 which, if made of the preferred ablative, arc-extinguishing material, results in the generation of high quantities of de-ionizing, turbulent and cooling gases which raise the voltage of, are inimical to, and ultimately result in the extinguishment of the arc 104. Thus, the presence of the second gap 102 and of the second arc 104 in the first path 58 when the switch 14 is opened, as well as the action of the sleeves 86 and 98 in extinguishing the second arc 104, raise the arc voltage of the first path 58 following separation of the contacts 60 to assure current commutation to the second current path 68. Additionally, although the first gap 66 may be contaminated by the ignition products 76 of the power cartridge 74, the second gap 102 is physically shielded from these ignition products 76 by the telescoping of the sleeve 98 into the sleeve 86. Accordingly, the creation of the two gaps 66 and 102, the effectuation of a high arc voltage by the possible presence of the two arcs 64 and 104, the arc-extinguishing action of the sleeve 86 and 98, and the lack of exposure of the second gap 102 to the ignition products 76 all combine to reliably ensure current commutation from the first path 58 to the second path 68.

As noted earlier, in the generalized version of the invention depicted in FIGS. 2 and 3, only one contact, such as the contact 60, need be movable while the other contact 61 may be stationary. In this event, only the movable contact 60 need have associated therewith the sliding contact structure 78 and the terminal 92. If both contacts 60 and 61 are movable, both may include the sliding contact structure 78 and terminal 92, and three gaps are opened by the switch 14, further assuring the commutation of current from the first path 58 to the second path 68.

Figure 4:
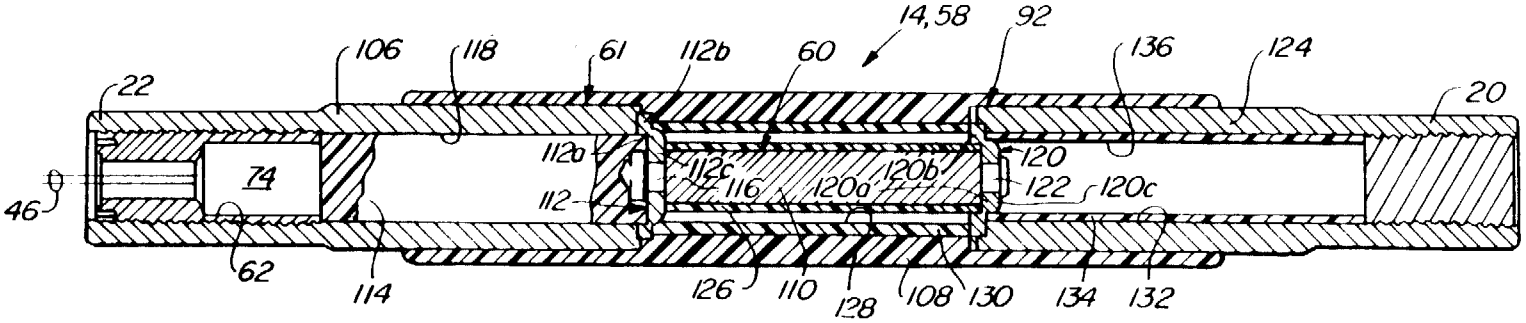
[FIG. 4 is a partially sectioned, side elevational view of an alternative embodiment of the switches shown in FIGS. 2 and 3 according to the principles of the presend invention; and]

[Turning now to FIG. 4, there is shown a specific embodiment of the present invention which includes an alternative of the improvement of FIGS. 2 and 3. While FIGS. 2 and 3 show a stationary terminal 92 which is telescoped into a movable, sliding contact structure 78 associated with the contact 60, in FIG. 4 the structure associated with the contact 60 is telescoped into a stationary terminal 92. Where possible, the reference numerals of FIGS. 1-3 have been utilized in FIG. 4 to denote the same or similar elements.]

[Shown in FIG. 4 is the switch 14, including the separable contacts 60 and 61, all of which are in the first path 58. The contact 61 comprises a conductive metal tube 106 stationarily held by or mounted to an insulative cylinder 108 which is preferably fiberglass-reinforced epoxy. The cylinder 108 may be used in place of or in addition to the inner housing 19 which may serve in whole or in part as a support for a portion of the second current path 68, as explained below. The cylinder 108 or the housing 19 may be utilized in the generalized embodiment of the switch 14 depicted in FIGS. 2 and 3 for housing the contacts 60 and 61 and other elements of those Figures. The contact 61 comprises a movable conductive metallic rod 110. Thus, the switch 14 of FIG. 4 represents a specific form of the embodiment depicted in FIGS. 2 and 3, namely, an embodiment in which the contact 61 is stationary and the contact 60 is movable.]

[The contacts 60 and 61 are normally electrically interconnected by an annular metallic member 112 which may have the general form depicted, which is normally attached between one end of the tube 106 and one end of the rod 110. As is disclosed more completely in the '646 application, the member 112 may take the form of an annular or ring-like metal diaphragm, as shown in detail in FIGS. 6 and 7 of the aforementioned application. In the case of the switch 14 in FIG. 4, the enclosed chamber 62 which contains the power cartridge 74 is formed in part by a piston-like trailer 114 made of an insulative, ablative, arc-extinguishing material and attached by a connector 116 to the rod 110. The trailer 114 is mounted for conformal movement within a bore 118 defined within a tube 106. Pressurization of the chamber 62 by ignition of the power cartridge 74 pushes the trailer 114 rightwardly, which moves the rod 110 rightwardly.]

[Instead of the sliding contact structure 78 depicted in FIGS. 2 and 3, the contact 60 is normally electrically connected to the terminal structure 92 by a metallic member 120 attached as convenient by a connector 122 to the rod 110. The member 120 may take a form similar to that of a metallic member 112. The terminal structure 92 may take the form of a conductive metallic tube 124 which may be stationarily held by the cylinder 108.]

[The rod 110 is covered with an insulative sleeve 126, preferably made of an ablative, arc-extinguishing material. The sleeve 126 and the rod 110 are movable through a bore 128 formed in a stationary sleeve 130 of an insulative material, preferably an ablative, arc-extinguishing material. The sleeve 130 may be stationarily mounted by the cylinder 108. A bore 132 formed in the tube 124 is lined with a sleeve 134 of an electrically insulative material, preferably an ablative, arc-extinguishing material which defines a passage 136. The passage 136 has substantially the same cross-section as, and may conformally receive, the rod 110 with the sleeve 126 thereon.]

[In operation of the device 10 which includes the switch 14 of FIG. 4, the first current path 58 comprises, in order, the tube 106 (the contact 61), the metallic member 112, the rod 110 (the contact 60), the metallic member 120, and the tube 124 (the terminal 92). The tubes 106 and 124 may constitute or form a part of the terminals 22 and 20, respectively, of FIG. 1. Accordingly, although not depicted in FIG. 4, the ends of the second path 68 may be respectively connected to the tubes 106 and 124. When it is desired to commutate current from the first current path 58 to the second current path 68, the power cartridge 74 is ignited. Ignition of the power cartridge 74 pressurizes the chamber 72 to move the trailer 114 and the rod 110 with the sleeve 126 thereon rightwardly. Such rightward movement breaks the normal electrical interconnection between the contacts 60 and 61 by ripping, tearing, or otherwise rendering discontinuous the member 112 as at a shoulder or necked-down area 112a to open the first gap (not shown), similar to the gap 66 between the contacts 60 and 61. A peripheral portion 112b of the member 112 remains attached to the tube 106, while a central portion 112c thereof remains attached to and is carried rightwardly by the trailer 114 and the rod 110 into the bore 128. This rightward movement also rips, tears, or otherwise renders discontinuous the metallic member 120 as at a shoulder or necked-down area 120a, opening the second gap (not shown), similar to the gap 102 between the rod 110 and the tube 124. A peripheral portion 120b of the member 120 remains attached to the tube 124, while a central portion 120c thereof remains attached to and is carried rightwardly by the rod 110 into the passage 132. Thus, similar to the embodiment of FIGS. 2 and 3, the switch 14 in FIG. 4 opens two gaps in order to ensure commutation of current to the second current path 68. Any arc (not shown) similar to the arc 64 forming in the first gap between the rod 110 (or the central portion 112c) and the tube 106 (or the peripheral portion 112b) is constricted between the trailer 114 and the sleeve 130 into which the trailer 114 moves. Thus, in the embodiment of FIG. 4, unlike that shown in FIGS. 2 and 3 (but like the structure in the '646 application), the contact 60 comprising the rod 110 is shielded to some extent from the ignition products of the power cartridge 74 by the trailer 114 and its conformal movement through the bore 128 of the sleeve 130. Further, if the trailer 114 and the sleeve 130 are made of an ablative, arc-extinguishing material, the first arc may be ultimately extinguished by the action thereof. In addition, the above-described rightward movement telescopes the rod 110 and then the sleeve 126 thereon into the passage 132 of the sleeve 134. Similar to the embodiment of FIGS. 2 and 3, this results both in the creation of the second gap 102 (not shown) between the contact 60 (or the central portion 120c) and the terminal 92 (or the peripheral portion 120b), and in the shielding of the end of the rod 110 carrying the central portion 120c from the ignition products 76 of the power cartridge 74 which may be in the vicinity. The second arc 104 which may form between the rod 110 and the tube 124 is extinguished by the action of the conformally telescoped sleeves 126 and 134.]

Figure 5:
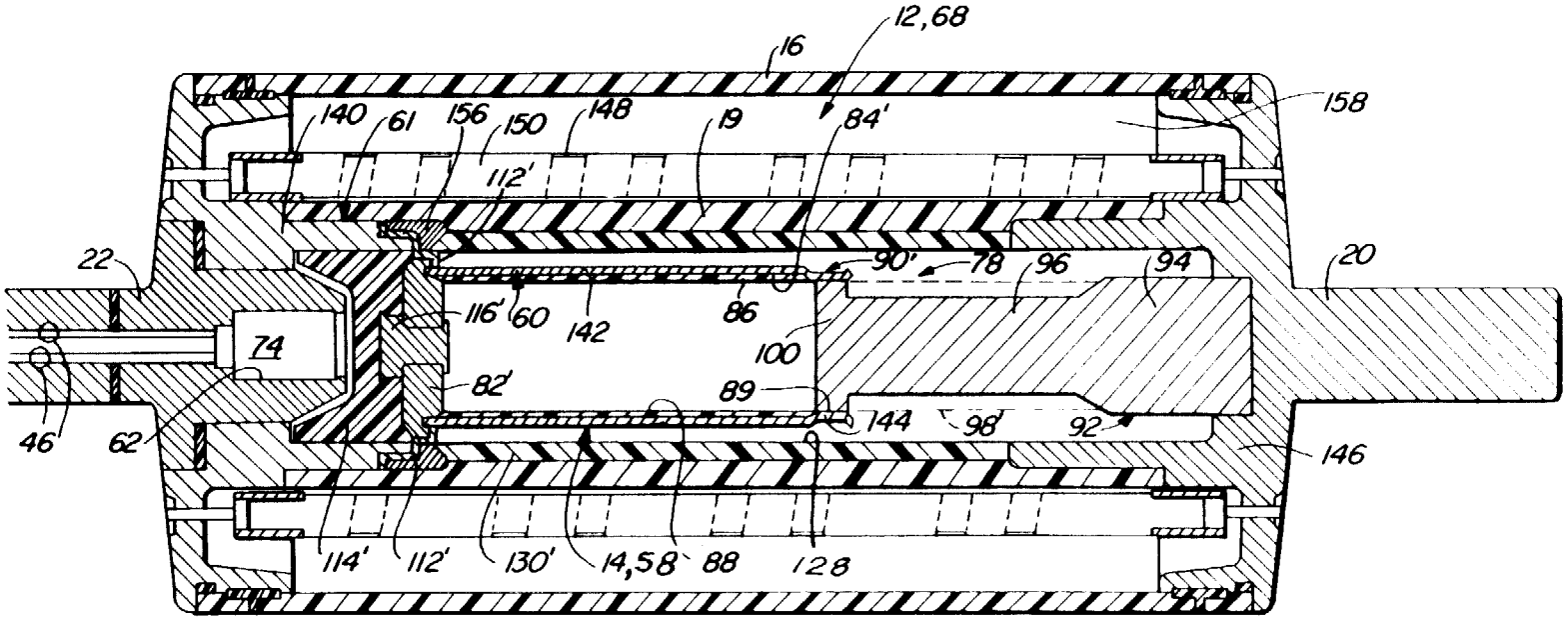
FIG. 5 is a partially sectioned, side elevational view of a specific embodiment of the device of FIG. 1 which includes a specific embodiment of the type of switch depicted in FIGS. 2 and 3.

FIG. 5 shows a specific embodiment of a complete device 10 which incorporates both the fuse 12 and the switch 14 according to the present invention. In the device 10 of FIG. 5, movable sliding contact structure 78 associated with the contact 60 is telescoped into a stationary terminal 92 along the lines of FIGS. 2 and 3 [and in contrast to the embodiment of FIG. 4]. Where possible, reference numerals the same as or similar to those used in [FIGS. 2–4] *FIGS. 2–3* refer to the same or similar elements. It should be noted that the embodiment depicted in FIG. 5 is similar to, but is an improvement of, that depicted in FIG. 6 of, but not claimed in, the '646 patent application.

Referring now to FIG. 5, it may be seen that the stationary contact 61 includes a cup-like member 140 to which is connected to the terminal 22. The member 140 may mount and stationarily hold the inner housing 19. Around the inner housing 19 is positioned the housing 16, which does not include the skirts 18 shown in FIG. 1. The chamber 62 is formed within the member 140 and houses the power cartridge 74 as shown. The contact 60 comprises a main body portion 82' similar to that shown in FIGS. 2 and 3 which mounts a hollow metallic tube 142. The tube 142 defines a bore 84' lined with the insulative sleeve 86, which in turn defines the passage 88, all similar to FIG. 1. The main body portion 82' of the contact 60 and the member 140 of the contact 61 are normally interconnected by a metallic member 112', [similar to the diaphragm 112 depicted in FIG. 4]. The main body portion 82' also mounts a piston-like trailer 114' [which has a configuration more cup-like than the trailer 114 shown in FIG. 4]. The trailer 114' is mounted to the main body portion 82 by a connector 116'. The tube 142 terminates in a necked-down portion 144 which defines a continuous contact end portion 90' similar in function to the contact end members 90 of the contact fingers 80 in FIGS. 2 and 3. The necked-down portion 144 is normally in electrical and mechanical engagement with the enlarged portion 100 of the terminal 92 which also includes the elongated portion 96 and the end portion 94. The portion 100 is conformally receivable in the passage 88. The end portion 94 is an electrical and mechanical engagement with a conductive cup-shaped member 146 which mounts the inner housing 19. The terminal 20 is shown as an integral portion of the member 146. A sleeve 130', [similar to the sleeve 130 shown in FIG. 4,] surrounds the contact 60 and the terminal 92 and is held in place by the inner housing 19. The sleeve 130' is made of an electrically insulative, ablative, arc-extinguishing material and defines a bore 128 which conformally receives the trailer 114' and the body member 82' following pressurization of the chamber 62 by the power cartridge 72.

As previously noted, the inner housing 19 may serve in whole or in part as the support for the second current path 68. In the embodiment depicted in FIG. 5, the second current path 68 includes one or more flat-wound current-limiting fusible elements 148 supported by an insulative support 150, which in turn is supported by or formed integrally with the inner housing 19. Each of the fusible [element] *elements* 148 are respectively connected to the members 140 and 146 so that the second current path 68, which here includes the fusible element 148, is in shunt with the first path 58. Before pressurization of the chamber 62, the first path 58 includes, in order, the terminal 22, the member 140, the member 112', the member 82', the tube 142, the contact end portion 90', the enlarged portion 100, the member 146, and the terminal 20.

Upon pressurization of the chamber 62 by ignition of the power cartridge 74, the piston 114', the body member 82', and the tube 142 all move rightwardly. This movement causes the metallic member 112' to sever, tear, or otherwise become discontinuous [similar to the member 112 of FIG. 4,] and the piston 114' and the sleeve 130' function as before to both shield the body portion 82' and the tube 142 from the ignition products of the power cartridge 74 and to constrict and extinguish any arc forming between the member 140 and the body portion 82'. In order to aid in the tearing or ripping of the metallic member 112', a cutting member 156 may be mounted by the housing 19. As the tube 142 moves rightwardly, the necked-down portion 144 defining the contact end portion 90' moves rightwardly away from the enlarged portion 100 of the terminal 92. Such enlarged portion 100 is thereafter continuously, electrically insulated from the tube 142 by the insulative sleeve 86 into the passage 88 of which it conformally telescopes. Thus, following ignition of the power cartridge 74, two gaps are formed by the switch depicted in FIG. 5. It should be noted that the second gap which forms between the enlarged portion 100 and the contact end portion 90', similar to the embodiments depicted in [FIGS. 2–4] *FIGS. 2–3*, both exhibits arc-extinguishing properties, by the appropriate inclusion of ablative, arc-extinguishing materials in the sleeve 86, and is shielded from the ignition products of the power cartridge 74. The contact structure 92 may also include an insulative sleeve 98' (similar to that depicted in FIGS. 2 and 3) shown in phantom in FIG. 5. [As should be clear, the telescoping relation of the terminal 92 and the sliding contact structure 78, as depicted in FIG. 5, may be reversed to achieve the relationship of FIG. 4, rather than that of FIGS. 2 and 3. Specifically, although not depicted, the main body portion 82' may carry a rod similar in structure to the rod 110 of FIG. 4, while the terminal structure 92 in FIG. 5 may be replaced by a tube similar to the tube 124. The member 120 of FIG. 4 may, but need not, be present. In this event, insulating sleeves similar to the sleeves 126 and 134 of FIG. 4 may contribute both to the formation of a second insulated gap 102, as well as the isolation of the rod 110 from the ignition products of the power cartridge 74 and the extinction of any arc 104 that is formed.]

A volume 158 defined between the outer and inner housings 16 and 19 may be filled with a fulgurite-forming, arc-quenching medium, such as silica or quartz sand (not shown). Although preferably the fusible elements 148 in combination with the sand within the volume 158 constitute a current-limiting fuse, such is not necessary. It is contemplated by the present invention that the second current path 68 may include or be constituted by a non-current limiting fusible element or other apparatus.

Various changes may be made in the above-described embodiments of the present invention without departing from the spirit and scope thereof. Such changes as are within the scope of the claims that follow are intended to be covered thereby.

What is claimed is:

1. An electrical switch for opening a first current path in which the switch is included, comprising:

a pair of normally electrically interconnected contacts for carrying current in the first current path, the contacts being relatively movable apart along a fixed line of direction to break the electrical interconnection therebetween and to open the first current path, at least one of the interconnected contacts defining *at least a portion of* an enclosed chamber;

a terminal in the first current path;

means for (a) electrically connecting a first of the contacts to the terminal when the contacts are electrically interconnected so that the terminal and contacts are in series in the first current path, and (b) electrically insulating the first contact from the terminal *with a solid insulative material* as and when the contacts move apart, *wherein the electrically insulating means also constricts any arc formed between the first contact and the terminal as and when the contacts move apart*; and ignitable means within the chamber for pressurizing the chamber upon ignition thereof to rapidly drive the contacts apart.

[2. An electrical switch as in claim 1 wherein:

the electrically insulating means also constricts any arc formed between the first contact and the terminal as and when the contacts move apart.]

3. An electrical switch for opening a first current path in which the switch is included, comprising:

a pair of normally electrically interconnected contacts for carrying current in the first current path, the contacts being relatively movable apart along a fixed line of direction to produce a gap therebetween and to break the electrical interconnection therebetween which opens the first current path, at least one of the interconnected contacts defining an enclosed chamber;

a terminal in the first current path;

means remote from the gap and the chamber for (a) electrically connecting a first of the contacts to the terminal when the contacts are electrically interconnected so that the terminal and contacts are in series in the first current path, and (b) electrically insulating the first contact from the terminal as and when the contacts move apart; and ignitable means within the chamber for pressurizing the chamber upon ignition thereof to rapidly drive the contacts apart.

4. An electrical switch as in claim 3, wherein:

the electrically insulating means also constricts any arc formed between the first contact and the terminal as and when the contacts move apart.

5. An electrical switch as set forth in claims 1, [2], 3[or 4], *4, 21 or 27*, wherein the electrically insulating means also isolates the terminal [or the first contact] from [the] ignition products of the ignitable means as and when the contacts move apart.

6. A [high voltage] device which includes the switch of claim 1, [2,] 3[or], 4 *or 21* and which further comprises:

a second current path in electrical shunt with the first current path, movement of the contacts apart transferring current in the first current path to the second current path.

7. The device of claim 6, wherein:

the second current path [helically,] coaxially surrounds [the contacts, the terminal and] *at least a portion of* the first current path.

8. [A fuse which includes the] *The* device of claim 7[, and] which further comprises:

a fusible element in the second current path.

9. [A current-limiting fuse which includes the fuse] *The device* of claim 8[, and] which further comprises:

a fulgurite-forming medium surrounding and in contact with the fusible element[;]

[an inner housing which contains the contacts, the terminal, and the electrically connecting and electrically insulating means and which segregates the medium therefrom;

an outer housing which contains the inner housing, the fusible element, and the medium;

means for electrically connecting the terminal to one side of a circuit; and means for connecting the second contact to the other side of the circuit].

10. A switch as in claim 1, [2,] 3[or], 4[,] *or 21* wherein:

the terminal telescopes into a passage within the first contact as and when the contacts move apart, and the electrically insulating means comprises a first insulative sleeve on the terminal, and a second insulative sleeve lining the passage.

11. A switch as in claim 1, [2,] 3[or], 4 *or 21* wherein:

the first contact telescopes into a passage within the terminal as and when the contacts move apart, and the electrically insulating means comprises: *a first insulative sleeve on the first contact, and a second insulative sleeve lining the passage.*

12. An electrical switch for opening a first current path in which the switch is included, comprising:

a pair of normally electrically interconnected contacts in the first path [and], *the contacts being* relatively movable apart along a fixed line of direction to produce a first gap therebetween;

an enclosed chamber defined at least in part by at least one of the contacts when they are electrically interconnected;

a terminal in the first current path;

first means remote from the first gap and from the chamber for (a) electrically connecting a first of the contacts to the terminal when the contacts are electrically interconnected so that the terminal and the contacts are in series in the first path, and (b) producing a second [insulated] gap, *which is insulated,* between the first contact and the terminal as and when the contacts move apart, the first and second gaps being in series in the first path; and

[second] ignitable means in the chamber for pressurizing the chamber upon ignition thereof to rapidly drive the contacts apart.

13. A switch as in claim 12, wherein:

as the second gap is produced, the first means (a) constricts any arc formed between the first contact and the terminal, and (b) isolates the second gap from [the] ignition products of the [second] *ignitable* means.

14. A switch as in claim 13, wherein:

the terminal telescopes into a passage in the first contact as the second gap is produced, and the first means comprises:

a first electrically insulative sleeve covering a portion of the terminal, and a second electrically insulative sleeve lining and covering a portion of the first contact within the passage, the telescoping of the terminal into the passage causing the sleeves to conformally[,] *and* slidingly engage, thus separating the first contact from the terminal and insulating the second gap.

15. A switch as in claim 13, wherein:

the first contact telescopes into a passage in the terminal as the second gap is produced, and the first means comprises:

a first electrically insulative sleeve covering a portion of the first contact, and a second electrically insulative sleeve lining and covering a portion of the terminal within the passage, the telescoping of the first contact into the passage causing the sleeves to conformally[,] *and* slidingly engage, thus separating the first contact from the terminal and insulating the second gap.

16. A switch as in claim 14 or 15, wherein:

[the first means further comprises]

portions of the first contact and the terminal not covered by the sleeves[, the uncovered portions being] *are*

(a) engaged and electrically connected when the contacts are electrically interconnected, and (b) separated and adjacent one of the sleeves as and when the contacts move apart.

17. A switch as in claim 16, wherein:

the sleeves include an ablative arc-extinguishing material.

18. An electrical device which includes the switch of claim [17] *16*, and which further comprises:

a second current path in shunt with the first current path, *wherein formation of the first and second gaps transfers current from the first current path to the second current path.*

19. [A fuse which includes the] *The* device of claim 18[, and] which further comprises:

a fusible element in the second path.

20. [A fuse as in] *The device of* claim 19[,] wherein the fusible element coaxially surrounds *at least a portion of* the first path.

*21. An electrical switch for opening a first current path in which the switch is included, comprising:*

*a pair of normally electrically interconnected contacts for carrying current in the first current path, the contacts being relatively movable apart along a fixed line of direction to break the electrical interconnection therebetween and to open the first current path, at least one of the interconnected contacts defining at least a portion of an enclosed chamber;*

*a terminal in the first current path;*

*means for*

*(a) electrically connecting a first of the contacts to the terminal when the contacts are electrically interconnected so that the terminal and contacts are in series in the first current path, and*

*(b) electrically insulating the first contact from the terminal as and when the contacts move apart; and*

*a power cartridge within the chamber for pressurizing the chamber upon the ignition thereof to rapidly drive the contacts apart.*

*22. A switch as in claim 1, 3, 12 or 21 wherein:*

*the terminal telescopes into a passage within the first contact as and when the contacts move apart, and the electrical insulating means comprises:*

*an insulative sleeve lining the passage.*

*23. A switch as in claim 1, 3, 12 or 21 wherein:*

*the first contact telescopes into a passage within the terminal as and when the contacts move apart, and the electrical insulating means comprises:*

*an insulative sleeve lining the passage.*

*24. An electrical switch as in claim 3, wherein:*

*the electrical insulating means is comprised of a solid insulative material.*

*25. An electrical switch as in claim 1, 3, or 12 wherein said ignitable means further comprises a power cartridge.*

*26. An electrical switch as in claim 21, wherein:*

*the electrically insulating means also constrict any arc formed between the first contact and the terminal as and when the contacts move apart.*

*27. A switch as in claim 1, 3, 12 or 21 further comprising contact insulating means for electrically insulating the first contact from the second contact as and when the contacts separate.*

*28. A switch as in claim 27 wherein said contact insulating means further comprises solid insulative material.*

*29. An electrical switch as set forth in claims 1, 3, 4, 21 or 27 wherein the electrical insulating means also isolates the first contact from ignition products of the ignitable means as and when the contacts move apart.*

*30. The device as in claim 9 further comprising:*

*an inner housing which contains the contacts, the terminal, and the electrically connecting and electrically insulating means and which segregates the fulgurite-forming medium therefrom;*

*an outer housing which contains the inner housing, the fusible element, and the fulgurite-forming medium;*

*means for electrically connecting the terminal to one side of a circuit; and*

*means for connecting the second contact to the other side of the circuit.*

*31. An electrical switch as claimed in claim 12, wherein: the second gap is electrically insulated by a solid insulative material.*

* * * * *